(12) United States Patent
Kim et al.

(10) Patent No.: US 8,370,957 B2
(45) Date of Patent: Feb. 5, 2013

(54) METHOD AND APPARATUS FOR TRANSMITTING CONTENTS WITH LIMITED SYSTEM PERMISSIONS

(75) Inventors: Kang-Hee Kim, Yongin-si (KR);
Yong-Gwan Lim, Daejeon (KR);
Yong-Bon Koo, Daejeon (KR);
Yung-Joon Jung, Daejeon (KR);
Jae-Myoung Kim, Daejeon (KR);
Dong-Hyouk Lim, Daejeon (KR)

(73) Assignees: Samsung Electronics Co., Ltd, Suwon-Si (KR); Electronics and Telecommunications Research Institute, Daejeon (KR)

( * ) Notice: Subject to any disclaimer, the term of this patent is extended or adjusted under 35 U.S.C. 154(b) by 1043 days.

(21) Appl. No.: 11/999,218

(22) Filed: Dec. 4, 2007

(65) Prior Publication Data
US 2008/0134304 A1 Jun. 5, 2008

(30) Foreign Application Priority Data

Dec. 5, 2006 (KR) .......... 10-2006-0122261
Oct. 4, 2007 (KR) .......... 10-2007-0100070

(51) Int. Cl.
*G06F 21/20* (2006.01)
(52) U.S. Cl. .......... 726/30
(58) Field of Classification Search .......... 726/4
See application file for complete search history.

(56) References Cited

U.S. PATENT DOCUMENTS

| 5,835,911 | A * | 11/1998 | Nakagawa et al. .......... 1/1 |
| 6,074,434 | A * | 6/2000 | Cole et al. .......... 717/173 |
| 7,817,560 | B2 * | 10/2010 | Dierks et al. .......... 370/236 |
| 2001/0037318 | A1 * | 11/2001 | Lindskog et al. .......... 705/78 |
| 2003/0108199 | A1 * | 6/2003 | Pinder et al. .......... 380/200 |
| 2004/0216150 | A1 * | 10/2004 | Scheifler et al. .......... 719/330 |
| 2006/0107327 | A1 | 5/2006 | Sprigg et al. |

FOREIGN PATENT DOCUMENTS

| EP | 1465041 A2 | 10/2004 |
| KR | 10-2006-0092264 | 8/2006 |
| WO | WO 03/021467 A1 | 3/2003 |
| WO | WO 2006/055544 A2 * | 5/2006 |

OTHER PUBLICATIONS

Translation of First Office Action dated May 17, 2011 in connection with Chinese Patent Application No. 200810096082.9, 18 pages.
Extended European Search Report dated Oct. 26, 2011 in connection with European Patent Application No. 08154686.3, 6 pages.

* cited by examiner

*Primary Examiner* — Gilberto Barron, Jr.
*Assistant Examiner* — Devin Almeida (57) ABSTRACT

Provided is a method for transmitting contents with limited system permissions. In the method, a content request is received from a client terminal. A download descriptor is transmitted to the client terminal in response to the content request, the download descriptor including information about the authentication and permission of the client terminal system that can be managed in the contents. A content transmission request is received from the client terminal that has received the download descriptor. Contents are transmitted to the client terminal in response to the content transmission request.

21 Claims, 7 Drawing Sheets

```
<xsd:element name="permissions">  ~400
    <xsd:complexType>
        <xsd:sequence>
            <xsd:element ref="socketPermissions"/> ~401
            <xsd:element ref="processPermissions"/> ~403
            <xsd:element ref="filePermissions"/> ~405
        </xsd:sequence>
    </xsd:complexType>
</xsd:element>
```

FIG.4

```
<xsd:element name="filePermissions">  ~501
    <xsd:complexType>
        <xsd:sequence>
            <xsd:element name="setxattrPermission"
                type="lad:filePermissionType" minOccurs="0"/>
            <xsd:element name="getxattrPermission"
                type="lad:filePermissionType" minOccurs="0"/>
            <xsd:element name="getsecurityPermission"
                type="lad:filePermissionType" minOccurs="0"/>
            <xsd:element name="setsecurityPermission"
                type="lad:filePermissionType" minOccurs="0"/>
            <xsd:element name="listsecurityPermission"
                type="lad:filePermissionType" minOccurs="0"/>
        </xsd:sequence>
    </xsd:complexType>
</xsd:element>
```

FIG.5

```
<xsd:element name="processPermissions">   ~601
    <xsd:complexType>
        <xsd:sequence>
            <xsd:element name="taskCreatePermission"
                type="lad:emptySimpleType" minOccurs="0"/>
            <xsd:element name="setuidPermission"
                type="lad:emptySimpleType" minOccurs="0"/>
            <xsd:element name="setgidPermission"
                type="lad:emptySimpleType" minOccurs="0"/>
            <xsd:element name="setnicePermission"
                type="lad:permissionWithObject" minOccurs="0"/>
            <xsd:element name="setrlimitPermission"
                type="lad:emptySimpleType" minOccurs="0"/>
            <xsd:element name="setschedulerPermission"
                type="lad:permissionWithObject" minOccurs="0"/>
            <xsd:element name="getschedulerPermission"
                type="lad:permissionWithObject" minOccurs="0"/>
            <xsd:element name="killPermission"
                type="lad:permissionWithObject" minOccurs="0"/>
            <xsd:element name="capgetPermission"
                type="lad:permissionWithObject" minOccurs="0"/>
            <xsd:element name="sysctlPermission"
                type="lad:emptySimpleType" minOccurs="0"/>
            <xsd:element name="capablePermission"
                type="lad:emptySimpleType" minOccurs="0"/>
        </xsd:sequence>
    </xsd:complexType>
</xsd:element>
```

FIG.6

```
<xsd:element name="socketPermissions">   ~701
    <xsd:complexType>
        <xsd:sequence>
            <xsd:element name="socketCreatePermission"
                type="lad:emptySimpleType" minOccurs="0"/>
            <xsd:element name="bindPermission"
                type="lad:emptySimpleType" minOccurs="0"/>
        </xsd:sequence>
    </xsd:complexType>
</xsd:element>
```

FIG.7

METHOD AND APPARATUS FOR TRANSMITTING CONTENTS WITH LIMITED SYSTEM PERMISSIONS

CROSS-REFERENCE TO RELATED APPLICATION(S) AND CLAIM OF PRIORITY

This application claims priority under 35 U.S.C. §119(a) to an application filed in the Korean Intellectual Property Office on Dec. 5, 2006 and allocated Serial No. 2006-0122261, and an application filed in the Korean Intellectual Property Office on Oct. 4, 2007 and allocated Serial No. 2007-0100070, the contents of which are incorporated herein by reference.

TECHNICAL FIELD OF THE INVENTION

The present invention relates generally to a method and apparatus for transmitting contents with limited system permissions, and in particular, to a method and apparatus for predefining access rights for a content executing system and providing only the predefined access rights to contents, thereby preventing the unintended execution of the contents.

BACKGROUND OF THE INVENTION

With the ever-increasing use of mobile communication terminals, the importance of the security of the mobile communication terminals increases day by day. However, there are only a few operating systems or programs that can provide security solutions for mobile communication terminals.

For example, the Korean Electronics and Telecommunications Research Institute (ETRI) is developing security technologies, such as access control, user authentication, and encrypted file systems, that can be used as servers in LINUX (through "Research on Secure OS Technologies for Information Communication System Based Protection") and is promoting the commercialization of the security technologies through technology transfer to domestic companies.

As another example, a LINUX-based security project provides a process-level access control function and a system call function for those that are defined in configuration files of specific script formats. In the LINUX-based security project, a system demon process adds a security function to a system in accordance with the format defined in a script, which corresponds to system security technology rather than operating system (OS) kernel-level security technology.

As described above, most system securities are designed and used for a server or a main frame operating system (OS). Thus, it can be said that there is no security solution for mobile communication systems.

SUMMARY OF THE INVENTION

To address the above-discussed deficiencies of the prior art, it is a primary object of the present invention to substantially solve at least the above problems and/or disadvantages and to provide at least the advantages below. Accordingly, an object of the present invention is to provide a method and apparatus for transmitting contents with limited system permissions.

Another object of the present invention is to provide a method and apparatus for predefining access rights for a content executing system and providing only the predefined access rights to contents, thereby preventing the unintended execution of the contents.

According to one aspect of the present invention, a method for transmitting contents with limited system permissions includes the steps of: receiving a content request from a client terminal; transmitting a download descriptor to the client terminal in response to the content request, the download descriptor including information about the authentication and permission of the client terminal system that can be managed in the contents; receiving a content transmission request from the client terminal that has received the download descriptor; and transmitting contents to the client terminal in response to the content transmission request.

The contents may be programs that are installed and executed in the client terminal. The download descriptor may include an application program descriptor that includes information about the file, process and socket permissions for the contents transmitted to the client terminal. The download descriptor may further include information about an address of a download server transmitting the contents to the client terminal, information about the size of contents to be transmitted, and user-defined information. For example, the client terminal detects authentication information included in the download descriptor, installs the contents, and executes the installed contents in accordance with the system permission included in the download descriptor.

According to another aspect of the present invention, a server for transmitting contents with limited system permissions includes: a unit for receiving a content request and a content transmission request from a client terminal; a unit for transmitting a download descriptor to the client terminal in response to the content request, the download descriptor including information about the authentication and permission of the client terminal system that can be managed in the contents; and a unit for transmitting the contents to the client terminal in response to the content transmission request.

The contents may be programs that are installed and executed in the client terminal. The download descriptor may include an application program descriptor that includes information about the file, process and socket permissions for the contents transmitted to the client terminal. The download descriptor may further include information about an address of a download server transmitting the contents to the client terminal, information about the size of contents to be transmitted, and user-defined information. The server may further include a unit for detecting the received contents and authentication information included in the download descriptor, installing the received contents, and executing the installed contents in accordance with the system permission included in the download descriptor.

According to still another aspect of the present invention, an operating system with a memory includes a processing unit and a memory storage unit. Upon receipt of a content request from a client terminal, the processing unit transmits a download descriptor, which includes information about the authentication and permission of the client terminal system that can be managed in the requested contents, to the client terminal. Upon receipt of a content transmission request from the client terminal, the processing unit transmits the contents to the client terminal. The memory storage unit is connected to the processing unit to store the download descriptor and at least one command for transmitting contents to the client terminal.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged processing system.

Figure 1:
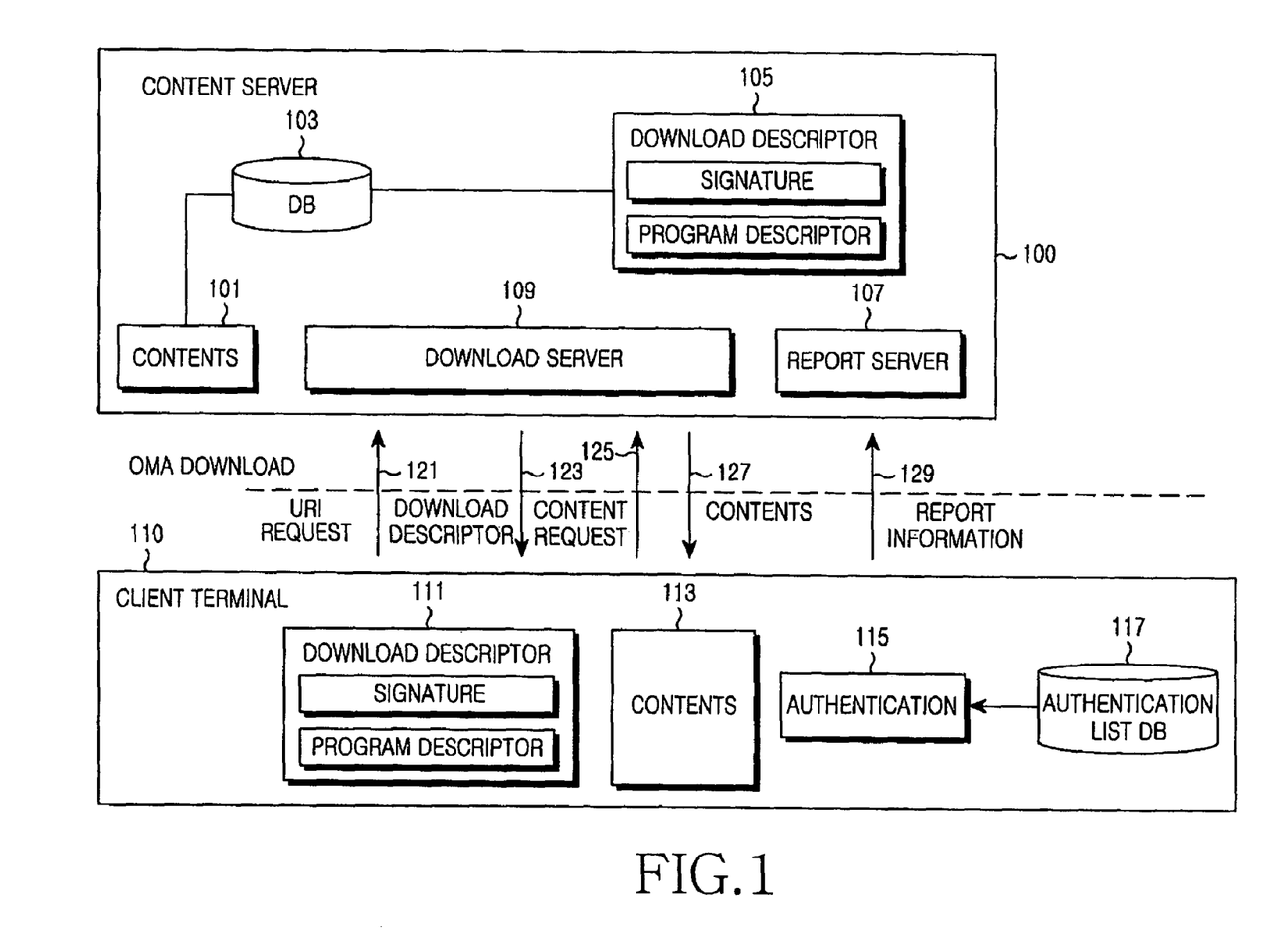
FIG. 1 illustrates a content providing method according to an embodiment of the present invention.

FIG. 1 illustrates a content providing method according to an embodiment of the present invention.

Referring to FIG. 1, a content server 100 provides contents to a client terminal 110.

The content server 100 includes a database (DB) 103 that contains contents 101 and a download descriptor 105. The download descriptor 105 includes program descriptors and electronic signatures of contents.

The client terminal 110 includes an authentication list DB 117 that contains authentication information corresponding to the electronic signature included in the content server 100. Thus, upon downloading contents 113 from the content server 100, the client terminal 110 authenticates the downloaded contents 113 using the authentication information contained in the authentication list DB 117.

In step 121, the client terminal 110 requests a Uniform Resource Identifier (URI) in order to download contents from the content server 100. In step 123, the content server 100 transmits a download descriptor 105 for the requested contents to the client terminal 110. In step 125, upon receipt of a download descriptor 111, the client terminal 110 requests contents using a content URI contained in the received download descriptor 111.

In step 127, the content server 100 transmits the contents 101 contained in the DB 103 to the client terminal 110. The client terminal 110 receives the contents 113 and authenticates (115) the received contents 113 using the download descriptor 111 and the authentication list DB 117.

Thereafter, the contents 113 are installed and executed in the client terminal 110 in accordance with control information contained in the download descriptor 111.

The download descriptor 111 contains detained information about the extent to which the received contents can control the client terminal. For example, the criterion for reading/writing a file in the client terminal, the extent of execution of an object and a task in a process, and the availability or not of a socket are defined in detail according to the downloaded contents 113.

Thus, when the downloaded contents 113 are to execute an unintended operation or an undesired operation, the execution of abnormal operations can be controlled by the control information contained in the download descriptor 111.

In step 129, the client terminal 110 transmits report information about the success or failure of the content receipt to a report server 107 included in the content server 100.

Herein, the signature values of the contents may be created using Secure Hash Algorithm 1 (SHA-1), which are encoded to be stored in an XML format.

Figure 2:
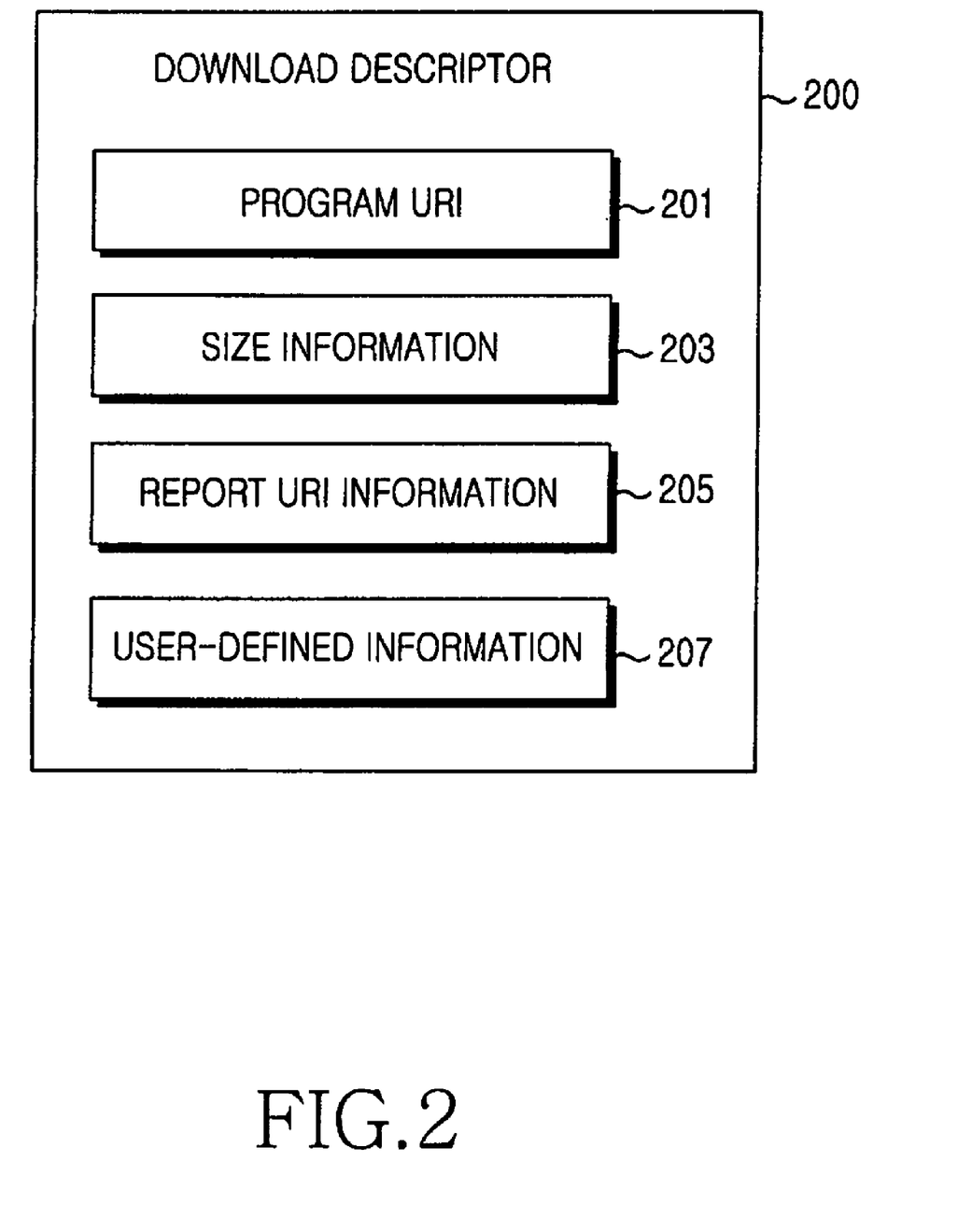
FIG. 2 is a block diagram of a download descriptor according to an embodiment of the present invention.

FIG. 2 is a block diagram of a download descriptor according to an embodiment of the present invention.

A download descriptor is generally used in an open mobile environment and a similar download descriptor is used in a Java environment. In one embodiment of the present invention, a download descriptor may be designed based on C language. The download descriptor may be designed in accordance with the recommendations of Open Mobile Alliance (OMA).

Referring to FIG. 2, a download descriptor 200 includes program URI information 201, program size information 203, report URI information 205, and user-defined information 207.

The program URI information 201 is information about a URI at the location of an application program.

The program size information 203 is information about the size of the application program. The program size information 203 is important because the knowledge of the size of an application program makes it possible to predetermine whether the application program can be installed.

The report URI information 205 includes URI information for downloading an application program from a content server, installing the downloaded application program and reporting the installation results to the content server.

The user-defined information 207 includes a variety of parameters or restrictions defined by a user. In the present invention, an application program descriptor is included in the user-defined information 207. The application program descriptor will be described below in detail with reference to FIG. 3.

Figure 3:
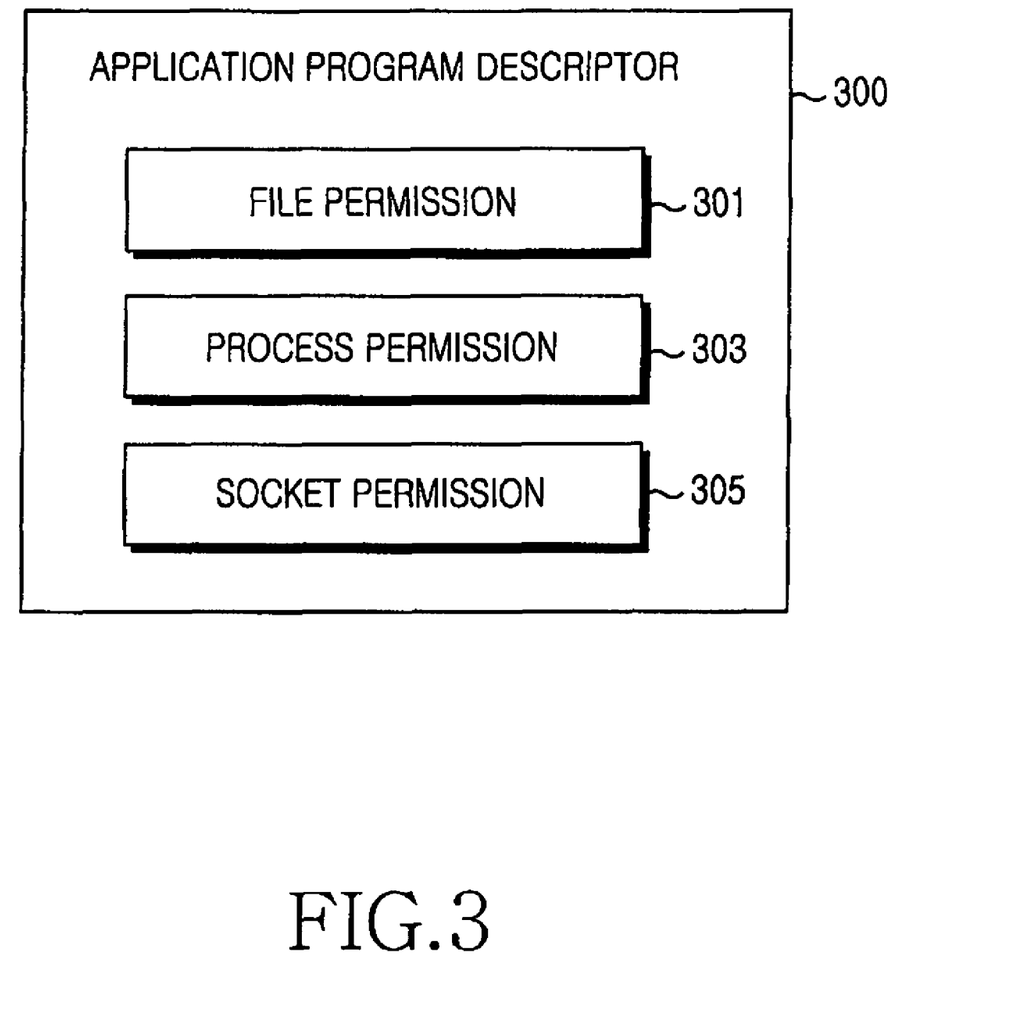
FIG. 3 is a block diagram of an application program descriptor according to an embodiment of the present invention.

FIG. 3 is a block diagram of an application program descriptor according to an embodiment of the present invention.

Referring to FIG. 3, an application program descriptor 300 includes a file permission manager 301, a process permission manager 303, and a socket permission manager 305.

The management of each of the permissions is to prevent contents, which are not intended by a developer, from being executed when a received program is executed in a client terminal.

The application program descriptor included in the download descriptor is downloaded and then a downloaded program operates according to the downloaded application program descriptor. In this case, the application program descriptor 300 precisely controls the program operation, thereby preventing an unintended program from accessing the system of a client terminal.

The file permission manager 301 is used to restrict the right of a file managed by a program. The process permission manger 303 is used to restrict the right of a process for program execution. The socket permission manger 305 is used to restrict the right to manage network communication.

Figure 4:
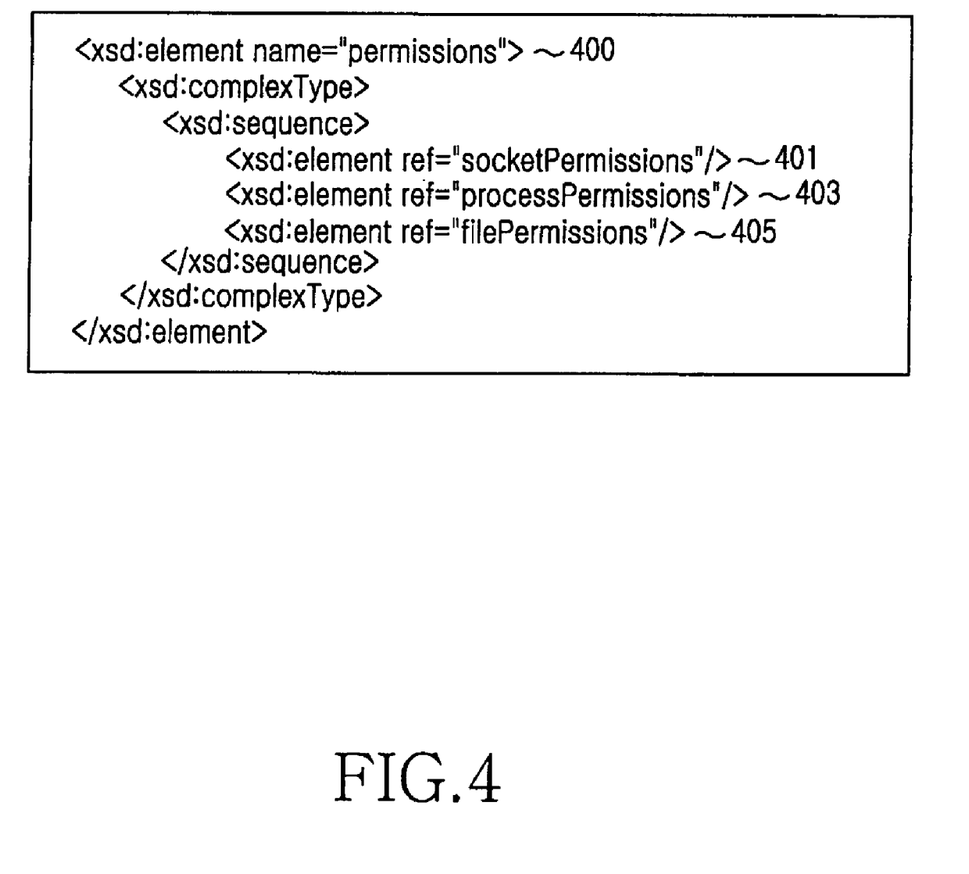
FIG. 4 illustrates an XML document representing the permissions of the application program descriptor according to an embodiment of the present invention.

FIG. 4 illustrates an XML document representing the permissions of the application program descriptor according to an embodiment of the present invention.

Referring to FIG. 4, a <xsd:element name="permissions"'> part 400 represents all the right permissions that can be managed by an application program descriptor of the present invention.

A <xsd:element ref="socketPermissions"/> part 401 represents the socket permissions of the application program descriptor, which will be described later in detail with reference to FIG. 7.

A <xsd:element ref="processPermissions"/> part 403 represents the process permissions of the application program descriptor, which will be described later in detail with reference to FIG. 6.

A <xsd:element ref="filePermissions"/> part 405 represents the file permissions of the application program descriptor, which will be described later in detail with reference to FIG. 5.

In this way, the application program descriptor of the present invention can be written in an XML format.

Figure 5:
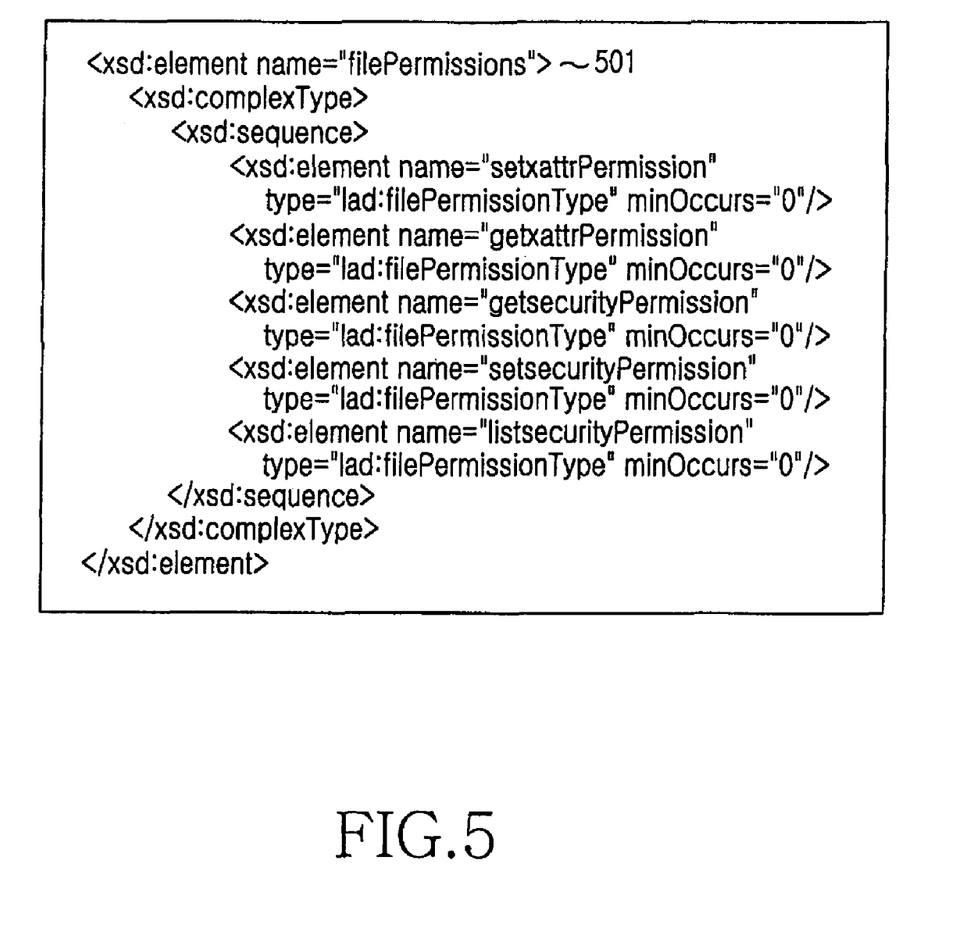
FIG. 5 illustrates an XML document representing the file permissions of the application program descriptor according to an embodiment of the present invention.

FIG. 5 illustrates an XML document representing the file permissions of the application program descriptor according to an embodiment of the present invention.

Referring to FIG. 5, it can be seen from a reference numeral 501 that the XML document represents the file permissions of the application program descriptor. Respective commands indicate that attributes of files and security-related files can be read or written.

Figure 6:
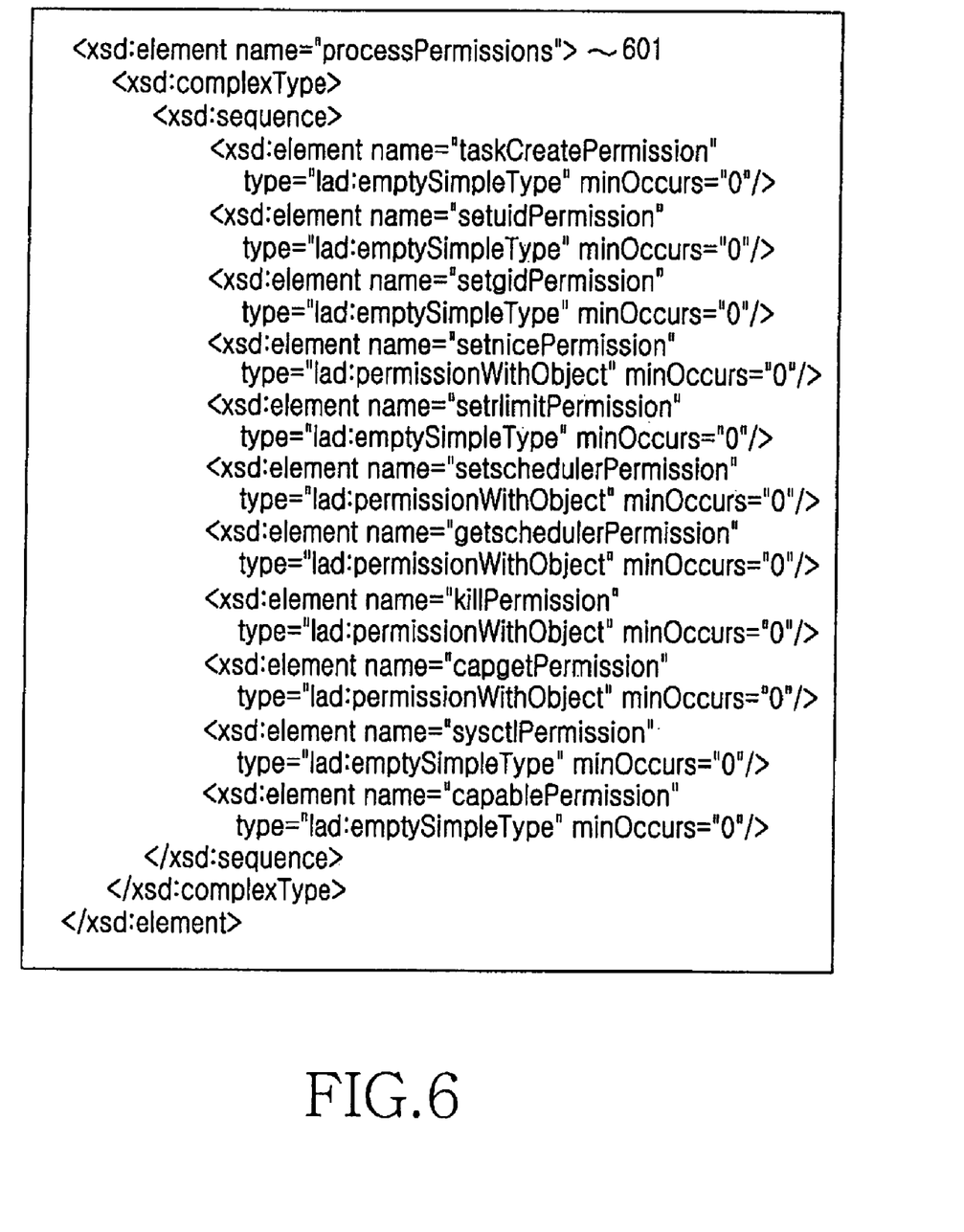
FIG. 6 illustrates an XML document representing the process permissions of the application program descriptor according to an embodiment of the present invention.

FIG. 6 illustrates an XML document representing the process permissions of the application program descriptor according to an embodiment of the present invention.

Referring to FIG. 6, it can be seen from a reference numeral 601 that the XML document represents the process permissions of the application program descriptor. Respective commands grant rights for the roles to create, install or remove program tasks, objects, and schedulers.

Figure 7:
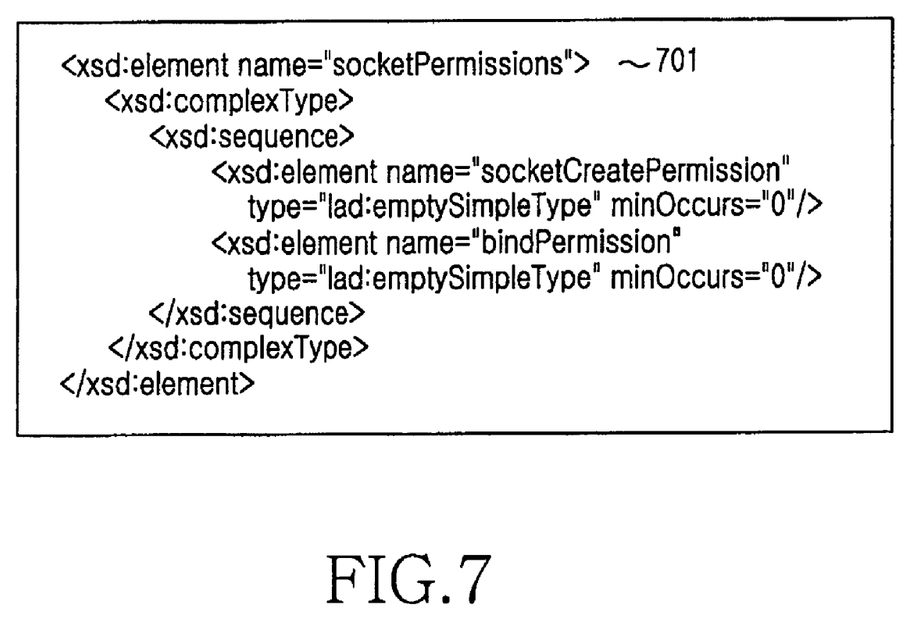
FIG. 7 illustrates an XML document representing the socket permissions of the application program descriptor according to an embodiment of the present invention.

FIG. 7 illustrates an XML document representing the socket permissions of the application program descriptor according to an embodiment of the present invention.

Referring to FIG. 7, it can be seen from a reference numeral 701 that the XML document represents the socket permissions of the application program descriptor. Respective commands grant rights for the roles to connect or disconnect the network of a client terminal. These detailed permissions are precisely set for the respective contents, thereby preventing a downloaded program from performing an intended operation that may cause damage to security.

As described above, the present invention can provide a method and apparatus for predefining access rights for a content executing system and providing only the predefined access rights to contents, thereby preventing the unintended execution of the contents.

Also, the present invention can provide a method and apparatus for transmitting contents with limited system permissions.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for executing contents with a system permission in a client terminal, the method comprising:
    transmitting a content download request to a content server;
    receiving a download descriptor from the content server, the download descriptor including information about the authentication and permission of a client terminal system that can be managed in the requested contents;
    transmitting a content transmission request to the content server in accordance with the download descriptor;
    receiving contents corresponding to the content transmission request from the content server;
    authenticating the received contents using the download descriptor;
    installing the received contents; and
    executing the installed contents in accordance with the system permission included in the download descriptor,
    wherein the download descriptor comprises permission information associated with reading/writing a file in the client terminal, an extent of execution of an object and a task in a process, and an availability of a socket.

2. The method of claim 1, wherein the contents are programs that are installed and executed in the client terminal.

3. The method of claim 1, wherein transmitting the content download request comprises requesting the download contents using a Uniform Resource Identifier (URI) of the contents included in the download descriptor.

4. The method of claim 1, wherein installing the received contents comprises:
    confirming the authentication for the received contents using authentication information included in the download descriptor; and
    installing the authenticated contents upon completion of the content authentication.

5. The method of claim 1, further comprising transmitting report information to a report server.

6. The method of claim 5, wherein the report information indicates a success or failure associated with the receipt of the contents.

7. The method of claim 1, wherein the download descriptor comprises electronic signatures of the contents, the electronic signatures created using Secure Hash Algorithm 1.

8. The method of claim 2, wherein transmitting the content download request comprises requesting the download contents using a Uniform Resource Identifier (URI) of the contents included in the download descriptor.

9. A client terminal for executing contents with a system permission, the terminal comprising:
    a transmitting unit configured to transmit a content download request and a content transmission request to a content server;
    a receiving unit configured to receive a download descriptor and contents corresponding to the content transmission request from the content server, the download descriptor including information about the authentication and permission of a client terminal system that can be managed in the requested contents;

a processing circuitry configured to authenticate the received contents using the download descriptor, install the received contents, and execute the installed contents in accordance with the system permission included in the download descriptor, wherein the download descriptor comprises permission information associated with reading/writing a file in the client terminal, an extent of execution of an object and a task in a process, and an availability of a socket.

10. The client terminal of claim 9, wherein the contents are programs that are installed and executed in the client terminal.

11. The client terminal of claim 9, wherein the transmitting unit is configured to transmit the content transmission request using a Uniform Resource Identifier of the contents included in the download descriptor.

12. The client terminal of claim 9, further comprising reporting circuitry configured to transmit report information to a report server.

13. The client terminal of claim 12, wherein the report information indicates a success or failure associated with the receipt of the contents.

14. A system comprising:
a content server; and
a client terminal configured to:
  transmit a content download request and a content transmission request to the content server;
  receive a download descriptor and contents corresponding to the content transmission request from the content server, the download descriptor including information about the authentication and permission of a client terminal system that can be managed in the requested contents;
  authenticate the received contents using the download descriptor;
  install the received contents; and
  execute the installed contents in accordance with the system permission included in the download descriptor,
wherein the download descriptor comprises permission information associated with reading/writing a file in the client terminal, an extent of execution of an object and a task in a process, and an availability of a socket.

15. The system of claim 14, wherein the contents are programs that are installed and executed in the client terminal.

16. The system of claim 14, wherein the client terminal requests the download contents using a Uniform Resource Identifier of the contents included in the download descriptor.

17. The system of claim 14, the content server comprising a report server, wherein the client terminal is further configured to transmit report information to the report server.

18. The system of claim 17, wherein the report information indicates a success or failure associated with the receipt of the contents.

19. The system of claim 14, the content server further comprising a download server.

20. The client terminal of claim 10, wherein the transmitting unit is configured to transmit the content transmission request using a Uniform Resource Identifier of the contents included in the download descriptor.

21. The system of claim 15, wherein the client terminal requests the download contents using a Uniform Resource Identifier of the contents included in the download descriptor.

* * * * *